Nov. 30, 1943.    F. R. KISSLING    2,335,769
WING NUT AND METHOD OF MAKING THE SAME
Filed June 9, 1943
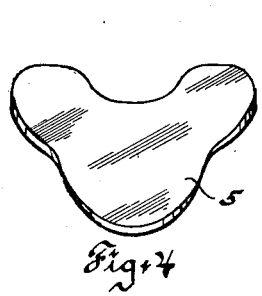
Fig. 4
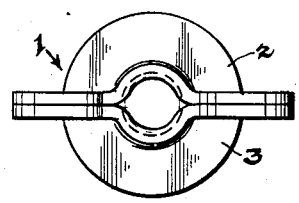
Fig. 2
Fig. 6
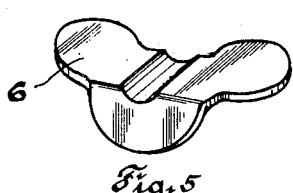
Fig. 5
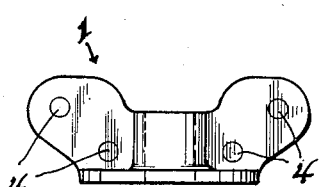
Fig. 1
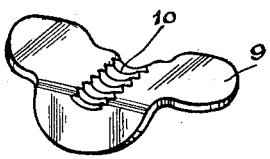
Fig. 7
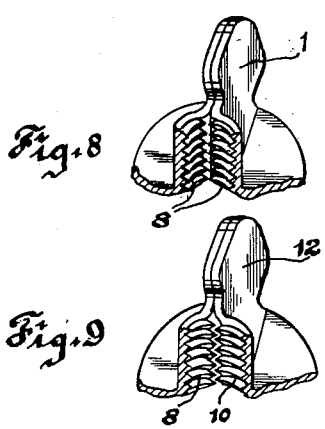
Fig. 8
Fig. 9
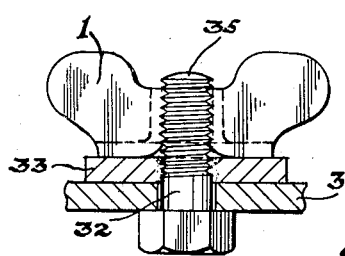
Fig. 3
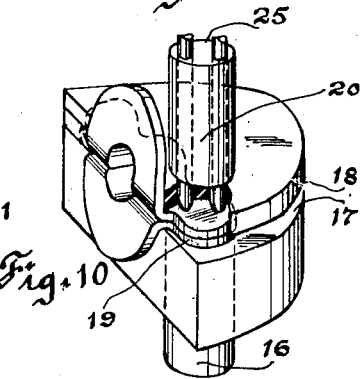
Fig. 10
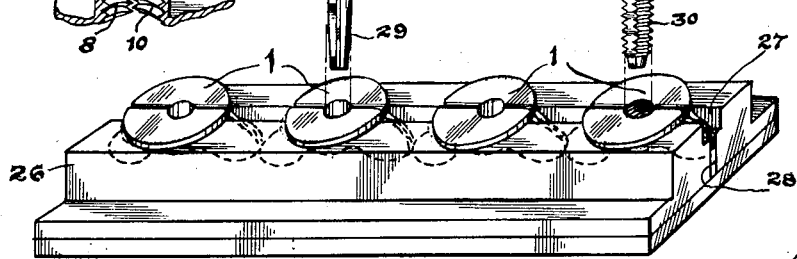
Fig. 12
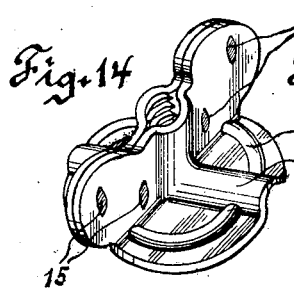
Fig. 14
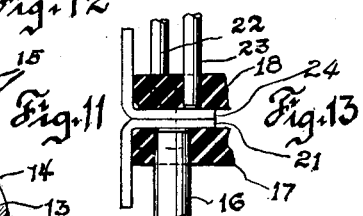
Fig. 11
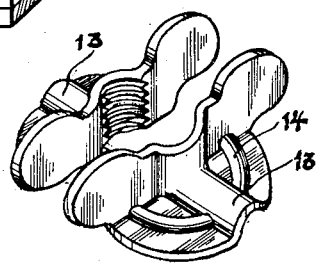
Fig. 13
INVENTOR.
Frank R. Kissling,
BY Saywell & Wesseler,
ATTORNEYS.

Patented Nov. 30, 1943

2,335,769

UNITED STATES PATENT OFFICE 2,335,769

WING NUT AND METHOD OF MAKING THE SAME

Frank R. Kissling, Cleveland Heights, Ohio

Application June 9, 1943, Serial No. 490,159

11 Claims. (Cl. 10—86)

This invention, as indicated, relates to a wing nut and method of making the same. More particularly, it comprises fabricating a wing nut from a pair of stamped metal plates providing a base portion and a wing portion at right angles thereto, each plate having a central area between the wings, of substantially semi-cylindrical shape to receive screw threads, and when united with a companion plate forming a central substantially cylindrical opening with cooperating screw threads on opposite portions. The invention has in view forming the screw threads by impressing the same on the plates before uniting a pair of plates and also where greater accuracy is required of sizing and tapping the central opening after the plates are united. The invention also permits the screw threads on one plate to be offset a fractional amount from the screw threads on the companion plate to provide a lock-nut effect when the nut is applied to the threads of the bolt or similar part upon which it is engaged.

The principal object of the present invention is to provide a method of forming wing nuts with the use of a minimum amount of metal and with a high degree of strength as well as on a quantity basis of production.

Another object of the invention is to provide a wing nut formed of united parts to provide a unit of predetermined size and of satisfactory precision fabrication and strength to serve all the various purposes of standard types of wing nuts formed by methods other than stamping.

Another object of the invention is to provide a method of making wing nuts of integrally united parts with opposite thread areas in the center opening offset a fractional amount to provide locking action when in use.

Another object of the invention is to provide a wing nut having a base with radial and circumferential reinforcing ribs providing a high degree of rigidity to the base portion of the device and permitting such base to be of enlarged extent without undue increase of weight or wastage of metal stock.

Another object of the invention is to unite a pair of wing nut plates over the wing areas thereof by means of a plurality of spot welds insuring permanent alinement and resistance to destructive forces.

Other and further objects of the invention will appear in the course of the following description.

To the accomplishment of the foregoing and related ends, said invention, then, consists of the means and method hereinafter fully described and particularly pointed out in the claims, the annexed drawing and the following description setting forth in detail certain structures and methods embodying the invention, such disclosed means and method constituting, however, but several of various forms in which the principle of the invention may be used.

In said annexed drawing:

Fig. 1 is a side elevation showing a wing nut embodying the principles of the invention;

Fig. 2 is a top plan view of the structure shown in Figure 1;

Fig. 3 is a side elevation, partly in section, of a wing nut applied as a central operative unit of a cover plate or the like;

Fig. 4 is a perspective view of a blank used in forming one half portion of a wing nut of the type shown in Figures 1 and 2;

Fig. 5 is a perspective view of a blank shaped to form a one-half portion of a wing nut with a central portion to be subsequently threaded;

Fig. 6 is a perspective view showing a wing nut with screw threads impressed therein as part of a stamping operation;

Fig. 7 is a view similar to Figure 6 showing the screw threads impressed in the one-half portion of a wing nut out of phase with the threads in the wing nut portion shown in Figure 6;

Fig. 8 is a fragmentary view showing two half sections of a wing nut united and disclosing the thread portions of said sections in phase with each other;

Fig. 9 is a view similar to Figure 8 with the thread portions of the two sections of the wing nut slightly out of phase with each other;

Fig. 10 is a diagrammatic perspective view showing the manner of spot welding the wing portions of two half sections of a wing nut as positioned between the electrodes of a welding apparatus;

Fig. 11 is a diagrammatic sectional view showing the position of the welding contacts;

Fig. 12 is a view illustrating the method of sizing and tapping the central apertures of the wing nuts progressively;

Fig. 13 is a perspective view showing two portions of a wing nut having a radial reinforcing rib formed centrally of each half, and also a circumferential reinforcement rib; and Fig. 14 is a view showing the parts disclosed in Figure 13 united by spot welds to form a reinforced wing nut unit.

As is clearly shown in Figures 1 and 2 the wing nut 1 is formed of two halves 2, 3, of the type shown in Figures 5, 6 and 7, the halves being united at spaced points on each of the wings thereof by spot welds 4. Each half portion of the wing nut is formed from a blank 5 of the general type shown in Figure 4 and is shaped in a press to provide an element 6 of the type shown in Figure 5. The element 6 may be plain, as shown in Figure 5, or may be an element 7, as shown in Figure 6, provided with impressed screw threads 8 adapted to be united with an identical member having the threads in phase so as to engage the threads of the nut by a bolt or the like. Instead of having the threads in phase, the element 9, as shown in Figure 7, may have the screw threads 10 impressed out of phase to approximately the extent of a fraction of an inch, such as .015 whereby the uniting of the elements 7 and 9, as in the manner shown in Figures 1 and 2, will produce a wing nut having a lock nut effect by reason of the offset relation of the threaded portion.

When the two halves of the wing nut have their threads in phase they will present the appearance as a completed wing nut 1, as shown in Figure 8. If, however, it is desired to produce a locking wing nut, one element of the type shown in Figure 6 and another element of the type shown in Figure 7 are united to each other by welds over the wing portion thereof to produce a structure 12 with the threaded portion out of phase, as shown in Figure 9. For certain types of wing nuts where unusual strains are to be taken care of it may be found desirable to produce a wing nut formed of two halves, as shown in Figures 13 and 14 wherein a radial reinforcing rib 13 is formed in each half, and also a circumferential reinforcing rib 14 may be used where the size of the base portion of the wing nut is of relatively large extent.

The two portions, as shown in Figure 13, are united in the usual manner by spot welds 15 similar to the spot welds 4 heretofore referred to. It is to be understood that the wing nuts may incorporate both the radial and circumferential reinforcing ribs, or may incorporate the radial ribs alone or the reinforcing ribs alone.

In order to produce the welds rapidly, a welding apparatus embodying the elements shown diagrammatically in Figure 10 may be used. In such apparatus the lower electrode 16 projects through an insulating plate 17, and an upper insulating plate 18 is recessed to receive the superimposed wing portions 19 of the two sections of the wing nut. The upper electrode 20 when depressed against the adjacent upper wing will cause spot welds to be formed through the wing portion thereof. Simultaneous welding may be secured over the opposite wing portion in like manner by an electrode corresponding to the electrode 20. The manner in which the electrodes contact the wings is shown in Figure 11 wherein the lower electrode 16 bears against the lower wing 21, and the upper electrodes 22, 23, bear against the upper wing 24. The insulating plates 17, 18, protect the adjacent parts, and the upper electrodes are encased in insulating material 25, as shown in Figure 10. After a pair of wing nut sections corresponding to the element 6, shown in Figure 5, are united by welding they may be placed in a slideway 26, shown in Figure 12, having a slot 27 which is offset to provide a narrow lower portion 28 which engages the extreme lower portions of the wing nut and firmly holds each wing nut while it is subjected to the action of the sizing tool 29 and tapping tool 30 driven by suitable operating mechanism of conventional design.

Where it is desired to provide a cap member for a container provided with a central control device a wing nut may be applied centrally of the cap structure 31 through an aperture 32 therein, a washer 33 of suitable material, such as a sealing element being applied immediately below the wing nut 1 which may have the opposite screw threads offset in the manner shown in Figure 9 so as to lock upon the threaded bolt 35 and permit the handling of the cap member. The wing nut may be permanently secured to the bolt 35 by peening the upper portion thereof to firmly clamp the wing nut in permanent relation to the parts described.

Other modes of applying the principle of my invention may be employed instead of those explained, change being made as regards the structure and steps herein disclosed, provided the means stated by any of the following claims or the equivalent of such stated means be employed.

I therefore particularly point out and distinctly claim as my invention:

1. A method of fabricating wing nuts and the like which includes the steps of stamping a pair of plates of sheet metal each having a base portion and a wing portion at right angles thereto, the wing portion having a central semi-cylindrical area intermediate the wings, then forming suitable threaded impressions in said areas, thereafter registering the wing portions of a pair to contact the inner faces of the wings and provide a cylindrical threaded portion intermediate said wings and permanently uniting said contacting areas by welding.

2. A method of fabricating wing nuts and the like which includes the steps of stamping a pair of plates of sheet metal each having a base portion and a wing portion at right angles thereto, the wing portion having a central semi-cylindrical area intermediate the wings, then forming suitable threaded impressions in said areas over a predetermined area and with a spacing fixed with reference to the base of one plate differing in fractional offsetting from the spacing of the threaded impressions on a companion plate, thereafter accurately registering the wing portions of said plates to contact the wing portions thereof and provide a cylindrical threaded portion intermediate said wings with the fractional offset of the opposite threaded areas to cause locking action of the nut when in use, and uniting said contacting areas of the wings by welding.

3. A method of fabricating wing nuts and the like which includes the steps of stamping a pair of plates of sheet metal each having a base portion and a wing portion at right angles thereto, the wing portion having a central semi-cylindrical area of predetermined radius intermediate the wings, then contacting the inner faces of a pair of wing portions to provide a cylindrical portion intermediate said wings, then uniting the contacting inner faces by welding, and thereafter forming threads by sizing and tapping said central cylindrical portion.

4. A method of fabricating wing nuts and the like which includes the steps of stamping a pair of plates of sheet metal each having a base portion and a wing portion at right angles thereto, the wing portion having a central semi-cylindrical area of predetermined radius intermediate the wings, then contacting the inner faces of a pair of wing portions to provide a cylindrical portion intermediate said wings, then uniting the contacting inner faces by welding, and thereafter forming threads by sizing and tapping said central cylindrical portion by moving a line of said united pairs with wing portions held below in accurate alinement progressively below self-centering and tapping units.

5. A method of fabricating wing nuts and the like which includes the steps of stamping a pair of plates of sheet metal each having a base portion and a wing portion at right angles thereto, the wing portion having a central semi-cylindrical area intermediate the wings, then forming suitable threaded impressions in said areas, thereafter registering the wing portions of a pair to contact the inner faces of the wings and provide a cylindrical threaded portion intermediate said wings and permanently uniting said contacting areas by spot welding simultaneously over each wing area.

6. A method of fabricating wing nuts and the like which includes the steps of stamping a pair of plates of sheet metal each having a base portion and a wing portion at right angles thereto, the wing portion having a central semi-cylindrical area of predetermined radius intermediate the wings, then contacting the inner faces of a pair of wing portions to provide a cylindrical portion intermediate said wings, then uniting the contacting inner faces by spot welding simultaneously over each wing area, and thereafter forming threads by sizing and tapping said cylindrical portion.

7. An article of the character described having in combination a pair of stamped metal plates of identical shape each having a flat base portion and a wing portion at right angles thereto with a substantially semi-cylindrical portion between the wings and united integrally with the wing portions of its companion plate in accurate register to provide a central cylindrical portion with opposite threaded areas in cooperative alinement.

8. An article of the character described having in combination a pair of stamped metal plates of identical outline each having a flat base portion and a wing portion at right angles thereto with a substantially semi-cylindrical portion between the wings and united integrally with the wing portions of its companion plate in accurate register to provide a central cylindrical portion with opposite threaded areas in slightly offset cooperative alinement to provide lock nut engagement when in use.

9. An article of the character described having in combination a pair of stamped metal plates of identical shape each having a flat base portion and a wing portion at right angles thereto with a substantially semi-cylindrical portion between the wings, each base portion having centrally a radial rib merging in a filet with the base of the semi-cylindrical portion and each wing portion united integrally with the wing portions of its companion plate in accurate register to provide a central cylindrical portion with opposite threaded areas in cooperative alinement.

10. An article of the character described having in combination a pair of stamped metal plates of identical shape each having a flat base portion and a wing portion at right angles thereto with a substantially semi-cylindrical portion between the wings, each base portion having a circumferential rib of substantially semi-circular extent spaced from its outer margin, and each wing portion united integrally with the wing portions of its companion plate in accurate register to provide a central cylindrical portion with opposite threaded areas in cooperative alinement.

11. An article of the character described having in combination a pair of stamped metal plates of identical shape each having a flat base portion and a wing portion at right angles thereto with a substantially semi-cylindrical portion between the wings, each base portion having centrally a radial rib merging in a filet with the base of the semi-cylindrical portion and having a circumferential rib of substantially semi-circular extent spaced from its outer margin, and each wing portion united integrally with the wing portions of its companion plate in accurate register to provide a central cylindrical portion with opposite threaded areas in cooperative alinement.

FRANK R. KISSLING.